United States Patent Office 3,013,232
Patented Dec. 12, 1961

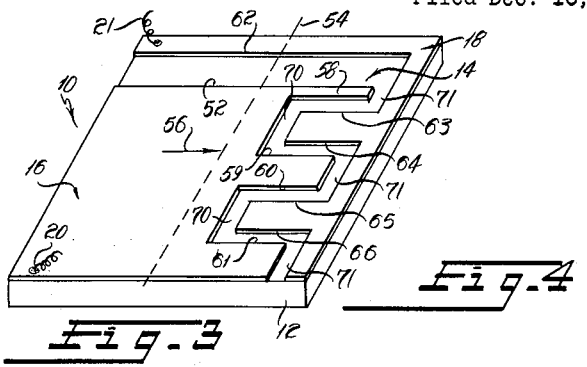

3,013,232
CONTROL OF RESPONSE CURVES FOR
PHOTOELECTRIC CELLS
Marvin Lubin, La Grange, Ill., assignor to Hupp Corporation, Cleveland, Ohio, a corporation of Virginia
Filed Dec. 16, 1957, Ser. No. 702,862
12 Claims. (Cl. 338—17)

This invention relates to photoelectric cells and more particularly to the positioning of electrodes for a photoconductive body of a semiconductor material such as cadmium sulfide to control the response curve of the cell.

The photoconductive properties of certain semiconductor materials are well known and among these semiconductor materials cadmium sulfide has been used to a considerable extent because it exhibits very large changes in resistance between a darkened condition and an illuminated condition, and is capable of passing relatively large currents when illuminated. Cadmium sulfide has been used in the form of large monocrystals with electrodes applied to opposite sides and also in the form of evaporated layers.

The present invention is described in connection with photoconductive semiconductors which are adapted to be so applied between the electrodes through which the electrical voltage is applied to the semiconductor that special shapes of electrodes may be used. The photocells of the present invention are adequately large relative to the size of the illumination pattern so that selected areas less than the whole of the cell are subjected to illumination. This makes it possible to control the electrical output from the cell so that voltages and/or currents proportional to the displacement of the light beam from a reference position can be readily obtained, and more important, the sensitivity of the cell in selected regions may be modified to provide an over-all response curve for the cell which is especially adapted for the particular industrial application involved.

An object of this invention is to provide a novel electrode arrangement for photoelectric cells so that the electrical output is suitable for use in a wide range of apparatus and systems including servo-mechanism controls, tracking apparatus as used for example in tracking celestial objects, microcounters for registering the revolutions or degree of revolutions of shafts, wheels, and the like, and other types of apparatus and systems where a controlled variable electrical current output from a photoelectric cell is desirable.

Another object of this invention is to provide a photoelectric cell having two or more electrical outputs which are variable in response to movement of the illuminated region relative to the cell.

Still another object of the invention is to provide a novel photocell capable of producing an output voltage which varies in polarity in accordance with the direction of displacement of the light pattern relative to the cell and which varies in magnitude in accordance with the magnitude of the displacement of the light pattern.

Other objects and advantages of the invention will become apparent from the following detailed description and drawing, in which:

FIGURE 1 is a cross-section through a typical photoconductive cell constructed in accordance with this invention;

FIGURE 2 is a top plan view of an electrode arrangement for a photoelectric cell assembly illustrating the principles of the invention;

FIGURE 3 is a perspective view of a photoelectric cell illustrating the electrode arrangement of a preferred embodiment of this invention;

FIGURE 4 is a graph illustrating electrical current output from the photoelectric cell in FIGURE 3 in response to the path of photoconductive film between electrodes exposed to light;

FIGURE 5 is a top plan view of another embodiment of this invention illustrating an electrode pattern and paths of a photoconductive film therebetween capable of producing an output voltage which varies in polarity and magnitude in accordance with the displacement of the illumination pattern from a reference position;

FIGURE 6 is a circuit diagram of a bridge of the type with which a photoelectric cell having the pattern illustrated in FIGURE 5 may be used; and FIGURE 7 is a top plan view of a further embodiment of this invention illustrating another electrode pattern and paths of photoconductive film therebetween for producing output voltages varying in both magnitude and polarity.

In practicing this invention, a novel pattern of spaced electrodes and a path of a suitable photoconductive film therebetween is formed on a supporting surface of an electrically insulating base such as Pyrex glass in any well known or conventional manner. In United States Patent No. 2,688,564 to Forgue, a typical procedure for forming both the photoconductive cadmium sulfide film and the electrodes on a supporting surface is disclosed. The photoconductive film in the present invention may be formed over an entire supporting surface of the insulating base and a selected pattern of electrodes formed on top of the photoconductive film, or both the electrodes and photoconductive film may be formed directly on the insulating base by means of suitable masks with either the film of photoconductive material overlapping the electrodes or the electrodes overlapping the photoconductive film portions.

Refering now to FIGURE 1, there is illustrated a cross-sectional view of a representative photoconductive cell indicated generally at 10 having a base 12 of an insulating material such as Pyrex glass or the like. The upper surface 13 serves as a supporting area on which electrodes 16 and 18 are deposited. The electrodes 16 and 18 are preferably placed on base 12 in a thin layer having a thickness of the order of 5 microns and then the photoconductive film 14 of cadmium sulfide is evaporated through a suitable mask, not shown, to bridge the space between electrodes 16 and 18.

The electrode material is preferably gold or platinum in embodiments where the electrodes are applied to base 12 prior to application of the photoconductive film 14 because of the high temperatures required for sensitization of the cadmium sulfide film 14 and consequent diffusion of less stable metals. If the photoconductive material is applied to base 10 and sensitized prior to depositing the electrode material, other conventional electrode materials may be used. However, the process of applying the electrodes on sensitized cadmium sulfide is somewhat difficult and frequently causes the cell characteristics to be disturbed and operation of the cell to be less stable.

Leads 20 and 21 are attached to electrodes 16 and 18 respectively and with electrode spacings of the order of .05 mm., an applied voltage of 22 volts D.-C. is commonly used. As higher voltages are applied, larger electrode spacing is required to prevent voltage breakdown. Hence, any minimum electrode spacing must take into consideration the magnitude of voltage to be applied to electrodes 16 and 18. Larger spacings may, of course, be used with a consequent increase in minimum resistance of the cell when illuminated.

The electrical current output from a photoelectric cell of the illustrated type is, with light intensity and applied voltage held constant, directly proportional to the length of the path of photoconductive film between electrodes exposed to light and it, of course, follows that an increase in width of the path of the photoconductive film will proportionately increase the minimum resistance of the cell and thus reduce the maximum current through the cell. The maximum magnitude of the current produced by a photoelectric cell of the type described and operating under conditions of fixed applied voltage and illumination increases as the effective length of the path of photoconductive material increases since a longer length of photoconductive material provides more parallel current paths between the electrodes.

These considerations are utilized in accordance with the present invention to produce a variation in the amount of electrical current output from the cell in response to the path of photoconductive film exposed to light. The dimensions of the path of photoconductive film 14 of the photoelectric cell 10 in accordance with the present invention are determined by the electrode configuration. Typical examples are illustrated in FIGURES 2, 3, 5 and 7.

Referring now to FIGURE 2, there is illustrated a plan view of an embodiment of a photoelectric cell capable of producing a controllable electrical output which varies in accordance with the region of illumination of the photocell. Two spaced electrodes 16 and 18 are applied to base 12 along opposite sides thereof with electrical conductors 20 and 21 connected to electrodes 16 and 18 respectively. Electrode 16 is comprised of a series of strip sections 22, 23, 24, 25 and 26 extending at right angles from a connecting electrode portion 28. Electrode 18 is comprised of a series of strip sections 30, 31, 32, 33, 34 and 35 extending at right angles from a connecting electrode portion 38. The spaces between strip sections 22–26 and 30–35 serve as current conducting paths between the several strip sections. The photoconductive material, which preferably is an evaporated layer of cadmium sulfide, bridges all, or a major portion at least of the space between electrodes 16 and 18.

With a beam of light off to the right of the cell and having a sharply defined edge at a position indicated by the dotted line 40, maximum resistance is encountered and substantially no current is passed by the cell. As the edge of the light beam advances toward the position of dotted line 42, that part of the cell immediately to the right of the dotted line 40 is first illuminated, and the resistance of the illuminated portion is greatly decreased thereby causing an initial current flow through the shaded region 44. Since the strip sections 22–26 have varying lengths, the current passed by the cell at the initial movement of the edge of the light beam at 40 relative to the cell is only through the shaded region 44 between section 24 of electrode 16 and connecting portion 38 of electrode 18. As the light beam moves further to the left, current conduction starts through the photoconductive material at 45 between section 24 and electrode sections 32 and 33. As the edge of the light beam overlaps sections 23 and 25 of electrode 16, a still larger current conduction area indicated at 47 is established between section 23 and sections 31 and 32 and between section 25 and sections 33 and 34. The light beam is large relative to the size of the cell so that as the edge of the beam moves to a position indicated by dotted line 42, the entire right side of the cell is illuminated to provide a large length of low resistance paths between electrodes 16 and 18.

The change in current through the cell resulting from a change in position of the edge of the light beam can also be varied by tapering the edges of electrode sections 22–26 and 30–35 as indicated at 46, but control of the response current by varying the distance between the electrodes is not as effective as by varying the length of the paths since too small a distance results in a voltage breakdown and too large a distance requires a high intensity of illumination to produce a low resistance path between the electrodes.

The most effective and preferred means by which a controlled variable current response is provided involves the arrangement of the electrodes so that increased quantities of current through the cell result from the increase in area of the illuminated photoconductive material to provide an increase in the effective number of current paths between the electrodes rather than by varying the spacing between the electrodes.

Where an industrial application involving a photocell calls for two regions where the current output varies linearly with the displacement of the edge of the light beam at one rate over a first region, and at a second rate in a second region, use of the principles of the present invention results in a photocell having an electrode arrangement as shown in FIGURE 3.

Referring now to FIGURE 3, the photocell is again designated by the reference numeral 10 and has a cross section which is shown in FIGURE 1. The two electrodes are designated 16 and 18, and the photo conductive material 14 (not shown) is applied to bridge the gap between electrodes 16 and 18. Electrode 16 has a straight edge 52 which is perpendicular to the direction of movement of the edge 54 of the light beam indicated by arrow 56 and a number of parallel edges 58, 59, 60 and 61. Electrode 18 has corresponding edges 62, 63, 64, 65 and 66.

A beam of light having a sharply defined edge at 54 reduces the resistance of the photoconductive film between the electrodes over the region that is illuminated. As the edge 54 of the light beam moves in the direction of arrow 56, there is a slow rise of current output, assuming a constant applied voltage and intensity of illumination, because there is a gradually increasing length of photoconductive material subjected to the illumination to thereby provide more parallel paths for current conduction. In the embodiment illustrated in FIGURE 3, the current increases linearly with displacement of the edge 54 of the light beam for the first 0.2 inch travel as indicated by the graph of FIGURE 4. In the next 0.1 inch of travel, the fine comb-like electrode pattern formed by the shorter alternating sections providing additional current paths between electrode edges 58–61 and edges 63–66 through the photoconductive film 14 provides a section in the cell which has a high current sensitivity and hence a greater change in current per unit of displacement of edge 54 of the light beam. Thus when the edge 54 of the light beam moves to the right-hand edge of the comb-like sections, there is effectively a much larger length of photoconductive material serving as a current path between electrodes 16 and 18. The spacing or width between electrodes 16 and 18 in the comb-like sections 70 and 71 may be made sufficiently large so that these sections pass only an unappreciable part of the total current, or the spacings may be made sufficiently small, though large enough so that there is no voltage breakdown, to contribute noticeably to the shape of the response curve of FIGURE 4. Thus the angle at the intersection 72 of the linear parts 74 and 76 of the response curve of FIGURE 4 may be controlled to some extent by the spacing at sections 70 and the extreme upper end 78 of the response curve may be controlled by the spacing at sections 71.

The relative current sensitivities along the straight section having edges 52 and 62 and the comb-like sections of photoconductive film in the cell of FIGURE 3 are such that the current rises linearly with lengths up to 0.2 inch until reaching a value of one milliampere, and then the current rises abruptly to three milliamperes in the next 0.1 inch of travel of the leading edge 54 of the light pattern as shown in the graph of FIGURE 4. In this particular cell, the spacing between electrode edges 52 and 62 was made larger than the minimum necessary to prevent voltage breakdown to produce a desired change in current to change in light displacement ratio of 1 microampere for every $\frac{2}{1000}$ of an inch up to 1 milliampere of current. The spacing between electrode edges 58 and 63 was reduced to the optimum value for maximum current conductivity, and the four additional current paths associated with edges 58, 59, 60 and 61 of electrode 16 were sufficient to give a change in current to change in light displacement ratio of 40 microamperes for every $2/1000$ of an inch.

Prior attempts to achieve this type of response curve by varying only the space between the electrodes along edges 52 and 62 were unsuccessful since it was impossible to obtain the abrupt change as indicated at 72 in FIGURE 4 which was required in this application. This was in part due to a fringing of the electric field at the transition between the regions where the electrode spacing was changed. The electric field, instead of being perpendicular always to the edges of the electrodes at the space in the transition region where the narrow electrode spacing joins the wider electrode spacing, fringes out in a somewhat circular pattern and hence the abrupt change in current that was required could not be obtained. Moreover, the high current to displacement ratio required very low tolerances for the spacing between the electrodes which were difficult to maintain during manufacturing operations.

Referring now to FIGURE 5, there is illustrated another photocell with the pattern of electrodes so arranged that paths of photoconductive film therebetween which when constructed as illustrated in FIGURE 1, will be capable of producing a controllable variable amount of electrical current output. To simplify the drawing, the base has been omitted and only the disposition of the electrodes 80, 82 and 97 are shown in detail. It is to be understood, however, that the cell of FIGURE 5 has a cross section as shown in FIGURE 1.

A first electrode indicated generally at 80 comprises an elongated end section 81 having a plurality of parallel strip extensions 84 at right angles thereto and from adjacent one end 86 thereof to adjacent the opposite end 88 in progressively shorter lengths. Lead 92 is electrically connected to a second electrode indicated generally at 82 having parallel strip sections 94 which are in alignment with extensions 84 of electrode 80, but vary inversely in length from the parallel sections 84 of electrode 80 to have longer sections at the upper end 88 and shorter sections at the lower end 86.

Lead 96 is electrically connected to a common electrode, darkened on the drawing and indicated generally at 97, comprising a diagonal section 98 disposed between opposed ends of sections 84 and 94 and a plurality of substantially parallel strip sections 100, extending from diagonal section 98, which are positioned on alternate sides of electrode sections 84 and 94 of electrodes 80 and 82 respectively.

When the above pattern of electrodes is provided with a photoconductive film 14 therebetween, such as is illustrated in FIGURE 1, there is formed two separate paths of photoconductive material between the sections 84 and 100 indicated at 102, and between sections 94 and 100 indicated at 104. The edges of electrode 97 adjoin both current paths 102 and 104 respectively, with electrode 80 adjoining path 102 and electrode 82 adjoining path 104 respectively whereby lead 96 is a common lead connected to both leads 90 and 92 by circuits whose resistances vary in accordance with the pattern or position of illumination.

A photoelectric cell having a pattern of electrodes and a path of photoconductive film as shown in FIGURE 5 is readily adapted to be used in a bridge circuit as shown in FIGURE 6 with leads 90, 92 and 96 connected as indicated. If a sharply defined rectangular beam of light is projected from a source, such as a galvanometer mirror (not shown), to fall at the center of the pattern of the cell as indicated at 110, equal areas of photoconductive material on both parts of the cell will be illuminated and zero voltage will appear across output terminals 112 and 114 of the bridge. As the beam of light 110 moves to the left, the length of illuminated photoconductive material between the common electrode 97 and electrode 80 will increase to thereby increase the current flow between terminals 96 and 90 while the length of illuminated photoconductive material between the common electrode 97 and electrode 82 will decrease to thereby decrease the current flow between terminals 96 and 92. A voltage difference will then appear between terminals 112 and 114 of the bridge, the polarity of this voltage difference indicating the direction of the displacement of light beam 110 and the magnitude of the voltage difference indicating the magnitude of displacement or the distance of the light beam from center of the cell of FIGURE 5. This output voltage may accordingly be utilized in appropriate and conventional circuits to move the beam of light back to center.

Referring now to FIGURE 7, there is illustrated another pattern of electrodes and photoconductive film for use in a photoelectric cell capable of producing a controllable variable amount of electrical output between a common lead 120 and a plurality of electrical leads 122, 124, 126 and 128. Lead 120 is electrically connected to the common electrode shaded on the drawing and indicated generally at 130, comprising four substanitally 90-degree sectors made up of concentric sections 132 of diminishing arc length toward the center of the photocell. Adjacent ends of the concentric arced sections 132 of each sector are electrically connected to radius sections 134 which intersect at substantially 90-degree angles at the center of the photocell to form an X. Electrical leads 122, 124, 126 and 128 are electrically connected to electrodes indicated generally at 136, 138, 140 and 142 respectively. Electrode 136 has a radius section 144 having concentric arced sections 146 extending therefrom which diminish in length toward the center of the cell pattern. The arced sections 146 are disposed equally distant between corresponding concentric arc sections 132 of electrode 130 in quadrant A. Electrodes 138, 140 and 142 have a corresponding radius section and concentric arced sections of exactly the same configuration as electrode 136 in quadrants designated as B, C and D respectively.

On the described electrode pattern, a photoconductive film of cadmium sulfide is evaporated therebetween to provide a substantial area to serve as current paths through the cell with the electrode 130 serving as the common electrode for each of the other electrodes 136, 138, 140 and 142.

A photoelectric cell provided with the electrode and photoconductive film pattern of FIGURE 7 may be electrically connected to a pair of bridges of the type illustrated in FIGURE 6 to provide a two dimensional control circuit. Electrodes 130 and 136 could thus control a quadrant indicated at A, electrodes 130 and 138 control a quadrant indicated at B, electrodes 130 and 140 control a quadrant indicated at C, and electrodes 130 and 142 control a quadrant indicated at D. If a circular or other pattern of light symmetrical about a center point falls on the cell such that the center of the light pattern and the center of the cell coincide, a balanced electrical output can be obtained between leads 120, 122, 124 and 126. If then cells indicated by quadrants A and C are connected in a first bridge and cells indicated by quadrants B and D are connected in a second bridge, both bridges will show zero output. Assuming the circle of light should move upwards, then the bridge connected to quadrants A and C will continue to give zero output but the bridge connected to B and D will develop a voltage of a given polarity, for example positive. Now, if the circle of light should move downwardly, then the bridge connected to cells A and C again gives zero output while the bridge connected to B and D develops a negative voltage. The magnitude of the output voltage is proportional to the magnitude of the displacement of the center of the light beam from the center of the cell. A similar voltage varying in sense and magnitude develops in the bridge connected to terminals 136 and 140 of quadrants A and C respectively as the circular light beam deflects to the right or left.

As with the photoelectric cell of FIGURE 5, the magnitude of voltage output is proportional to the magnitude of displacement of the center of the circular beam of light from the center of the cell. In the preferred embodiment, the light beam has a diameter of about one-half the diameter of the cell, though other sizes of light beams can obviously be used.

The vector sums of the outputs of the bridges produce a value immediately equal to R and theta of the polar coordinate system to give both the angular and radial position of the center of the spot of light for use in conventional types of rebalance or computing apparatus. The output voltages of the bridges are thus adapted to operate servo-systems which orient the light projection mechanism for the cell so that the spot of light returns always to the center of the cell. The photoelectric cell of FIGURE 7 is readily adaptable to various guidance systems.

From the foregoing, it is apparent that with the cells of the present invention, the electrical output may be varied in accordance with the region of the cell that is illuminated. The resistance of the cell may be decreased at a particular region by increasing the length of electrode area which is illuminated to thereby increase the number of current paths through the photoconductive material or by so positioning the electrodes that the distance across the photoconductive material between the electrodes is varied within certain limits. By these means, the change in resistance over the different regions of the cell can be so controlled that the cells constructed in accordance with the present invention are adapted for use in a great variety of applications.

The foregoing description has been directed to the use of cadmium sulfide as a photoconductive semiconductor. It is to be understood that the invention is applicable to other semiconductor materials, and hence the type of radiant energy which may be used is determined only by the particular semiconductor material used.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A photoelectric cell for producing a controllable variable amount of electrical current output comprising a base having a supporting surface area; a pair of spaced electrodes on said surface; and a path of photoconductive material on said surface between said electrodes extending across different regions having equal areas on said photocell adapted to be exposed to a source of radiant energy providing a pattern of light on said cell having sharply defined edges; the spaces between said spaced electrodes covered by said photoconductive material being in a selected pattern defining means to vary the electrical resistance of the cell in accordance with the particular region of said photocell which is exposed to radiant energy; said path of said photoconductive material comprising a first elongated section and a plurality of shorter sections alternating in direction and electrically connected to said first elongated section adjacent an edge end thereof; said shorter sections forming an extension to said first elongated section and positioned to be unexposed to said radiant energy source with exposure of a portion of said first elongated section.

2. The photoelectric cell of claim 1 wherein the width of the path of photoconductive material between said electrodes in said extension is less than the width of the path of photoconductive material in said first elongated section.

3. A photoelectric cell for producing a controllable variable amount of electrical current output at a plurality of electrical leads comprising a base having a supporting surface area; at least three spaced elongated electrodes on said surface; and paths of photoconductive material on said surface between said electrodes to form a path of low electrical resistance therebetween when exposed to a source of radiant energy; one of said electrodes adjoining all the paths of photoconductive material of the cell and comprising a plurality of substantially parallel sections and having a section extending substantially diagonally from adjacent one end of a first outside section to adjacent the opposite end of an opposite outside section and electrically connected to all the parallel sections; and the other of said electrodes having elongated sections disposed between said parallel sections with one of said other electrodes being on one side of said diagonally extending section and another of said other electrodes being on the other side of said diagonally extending section.

4. A photoelectric cell capable of producing a controllable variable electrical current output comprising a base having a supporting surface area; at least three spaced elongated electrodes on said surface; and paths of photoconductive material on said surface between the facing edges of said electrodes adapted to be exposed to a source of radiant energy; one of said electrodes adjoining all of said paths of photoconductive material and being in a pattern generally conforming to a plurality of sectors of a circle and having in each sector concentric sections diminishing in arc length with adjacent ends of the concentric sections electrically connected to a radius section and the others of said electrodes each having arced sections disposed in distinct ones of said sectors between said concentric sections, the edges of said arced sections of said others of said electrodes in each sector being substantially equidistantly spaced from the facing edges of the adjacent ones of said concentric sections of said one electrode in such sector.

5. A multi-terminal photoelectric cell for producing a controllable variable amount of electrical current output at a plurality of electrical leads comprising a base having a plane supporting surface area; at least three spaced elongated electrodes on said surface; and paths of photoconductive material on said surface between said electrodes to form a low resistance electrical path therebetween when exposed to a source of radiant energy; one of said electrodes adjoining all the paths of photoconductive material of the cell and comprising a plurality of sectors of a circle having concentric sections diminishing in arc length toward the center of the photoelectric cell with adjacent ends of the concentric sections of each sector electrically connected to a radius section with the radius section of each of said sectors being electrically connected together, and the others of said electrodes being electrically independent from one another and having arced sections disposed alternately with said concentric sections of said one electrode, and means connecting the arced sections of each of said other electrodes to separate output terminals of said cell.

6. A photocell comprising a base of a non-conductive material, at least three electrodes in a generally rectangular pattern on said base with two of said electrodes each containing a plurality of non-intersecting finger-like sections joined electrically by a connecting section, and the third of said electrodes comprising a plurality of finger-like sections alternating with the finger-like sections of said two electrodes and joined electrically by a connecting section lying substantially along a diagonal of said rectangular pattern, and a layer of photoconductive material on said base bridging the finger-like sections of said electrodes to provide an electrical output varying both in magnitude and polarity in accordance with the position of a radiation pattern on the photocell.

7. A photocell comprising a base of a non-conductive material, five electrodes in a generally circular pattern on said base with four of said electrodes each containing a plurality of non-intersecting arcuate finger-like sections joined electrically by a radially extending connecting section and the fifth of said electrodes comprising a plurality of non-intersecting arcuate finger-like sections alternating with the finger-like sections of said four electrodes and joined electrically by radial connecting sections intersecting at the center of said circular pattern, and a layer of photoconductive material on said base bridging the finger-like sections of said electrodes to provide electrical outputs varying both in magnitude and polarity in accordance with the position of a radiation pattern on the photocell.

8. In a photocell, a pair of photoconductive sinuous bodies disposed in spaced relation on a non-conductive surface in a position to be irradiated, said sinuous bodies each comprising a plurality of elongated sections of uniform width and at least one of which is of greater length than the remainder thereof, the opposed edges of adjacent ones of said elongated sections being uniformly spaced, the adjacent pairs of said elongated sections being interconnected at alternate ends by bridge sections, a first metallic conductor having at least a portion disposed intermediate said photoconductive bodies in electrical contact with the adjacent edges of the elongated and bridge sections of both of said photoconductive bodies, a second metallic conductor disposed at one side of one of said photoconductive bodies opposite said first conductor in electrical contact with the adjacent edges of the elongated and bridge sections of said one photoconductive body, a third metallic conductor disposed on the side of the other of said photoconductive bodies opposite said first conductor in electrical contact with the adjacent edges of the elongated and bridge sections of said other photoconductive body.

9. The photocell defined in claim 8 wherein said sinuous photoconductive bodies are parts of a continuous layer of photoconductive material the remaining portions of which are shielded from irradiation by said metallic conductors.

10. The photocell defined in claim 8 wherein said photoconductive body elongated sections are rectilinear.

11. The photocell defined in claim 8 wherein said photoconductive body elongated sections are arcuate in form about a common center.

12. The photocell defined in claim 8 wherein said nonconductive surface is flat.

References Cited in the file of this patent
UNITED STATES PATENTS

| | | |
|---|---|---|
| 241,909 | Bell et al. | May 24, 1881 |
| 1,904,139 | Henkel et al. | Apr. 18, 1933 |
| 1,944,194 | Sackville | Jan. 23, 1934 |
| 2,065,365 | Doyle et al. | Dec. 22, 1936 |
| 2,310,365 | Hansell | Feb. 9, 1943 |
| 2,448,518 | Cashman | Sept. 7, 1948 |
| 2,462,823 | Woodward | Feb. 22, 1949 |
| 2,537,257 | Brattain | Jan. 9, 1951 |
| 2,668,184 | Taylor et al. | Feb. 2, 1954 |
| 2,765,385 | Thomsen | Oct. 2, 1956 |
| 2,768,310 | Kazan et al. | Oct. 23, 1956 |
| 2,776,357 | Porath | Jan. 1, 1957 |

FOREIGN PATENTS

| | | |
|---|---|---|
| 17,131 | Great Britain | July 20, 1914 |